(12) United States Patent
Zhang et al.

(10) Patent No.: US 11,412,274 B2
(45) Date of Patent: Aug. 9, 2022

(54) VIDEO TRANSMISSION METHOD AND APPARATUS, AND COMPUTER-READABLE STORAGE MEDIUM THEREOF

(71) Applicant: BOE Technology Group Co., Ltd., Beijing (CN)

(72) Inventors: Zhiguo Zhang, Beijing (CN); Ran Duan, Beijing (CN)

(73) Assignee: BOE Technology Group CO., LTD., Beijing (CN)

( * ) Notice: Subject to any disclaimer, the term of this patent is extended or adjusted under 35 U.S.C. 154(b) by 661 days.

(21) Appl. No.: 16/305,189

(22) PCT Filed: Apr. 13, 2018

(86) PCT No.: PCT/CN2018/083017
§ 371 (c)(1),
(2) Date: Nov. 28, 2018

(87) PCT Pub. No.: WO2019/001091
PCT Pub. Date: Jan. 3, 2019

(65) Prior Publication Data
US 2021/0227266 A1 Jul. 22, 2021

(30) Foreign Application Priority Data
Jun. 30, 2017 (CN) .......................... 201710520725.7

(51) Int. Cl.
*H04N 21/2343* (2011.01)
*H04N 21/2183* (2011.01)
(Continued)

(52) U.S. Cl.
CPC ..... *H04N 21/2343* (2013.01); *H04N 21/2183* (2013.01); *H04N 21/23106* (2013.01); *H04N 21/4402* (2013.01); *H04N 21/44004* (2013.01)

(58) Field of Classification Search
CPC ......... H04N 21/2343; H04N 21/23106; H04N 21/2183; H04N 21/4402; H04N 21/44004
See application file for complete search history.

(56) References Cited

U.S. PATENT DOCUMENTS

2007/0261096 A1* 11/2007 Lin .................. H04N 21/44004
725/134
2010/0040137 A1 2/2010 Chiang et al.
(Continued)

FOREIGN PATENT DOCUMENTS

| CN | 1276570 A | 12/2000 |
| CN | 1750463 A | 3/2006 |

(Continued)

OTHER PUBLICATIONS

International Search Report dated Jul. 18, 2018 from PCT/CN2018/083017.
(Continued)

*Primary Examiner* — Pinkal R Chokshi
(74) *Attorney, Agent, or Firm* — Fay Sharpe LLP

(57) ABSTRACT

The present disclosure relates to a video transmission method, apparatus and computer-readable storage medium in the field of video play. The method includes: acquiring a first video frame and a second video frame of a video to be transmitted; acquiring difference information of the second video frame relative to the first video frame; and sending the difference information to a video receiving apparatus, the difference information being used for instructing the video receiving apparatus to generate the second video frame based on the difference information and the first video frame after receiving the first video frame. The needed bandwidth is small in the video transmission method of the present
(Continued)

disclosure, the video transmission may not be restricted by the distance, and thus video transmission has a high flexibility.

14 Claims, 12 Drawing Sheets

(51) Int. Cl.
*H04N 21/4402* (2011.01)
*H04N 21/231* (2011.01)
*H04N 21/44* (2011.01)

(56) References Cited

U.S. PATENT DOCUMENTS

| | | | | |
|---|---|---|---|---|
| 2010/0195713 | A1* | 8/2010 | Coulombe | H04N 19/61 |
| | | | | 375/E7.126 |
| 2011/0007168 | A1* | 1/2011 | Nagara | H04N 21/4402 |
| | | | | 348/193 |
| 2012/0079142 | A1 | 3/2012 | Fleegal et al. | |
| 2015/0312574 | A1* | 10/2015 | Ying | G09G 5/363 |
| | | | | 345/212 |
| 2015/0373328 | A1* | 12/2015 | Yenneti | H04N 19/31 |
| | | | | 375/240.03 |
| 2016/0142766 | A1 | 5/2016 | Wang | |
| 2017/0064379 | A1* | 3/2017 | Lee | H04N 21/6379 |

FOREIGN PATENT DOCUMENTS

| | | |
|---|---|---|
| CN | 101609652 A | 12/2009 |
| CN | 102710935 A | 10/2012 |
| CN | 103248946 A | 8/2013 |
| CN | 103731250 A | 4/2014 |
| CN | 105096807 A | 11/2015 |
| CN | 105847871 A | 8/2016 |
| CN | 105959796 A | 9/2016 |
| CN | 106254869 A | 12/2016 |
| CN | 106713913 A | 5/2017 |
| WO | WO2015021587 A1 | 2/2015 |

OTHER PUBLICATIONS

Extended European search report of counterpart EP application No. 18800825.4 dated Oct. 19, 2020.
First office action of Chinese application No. 201710520725.7 dated Sep. 29, 2019.

* cited by examiner

VIDEO TRANSMISSION METHOD AND APPARATUS, AND COMPUTER-READABLE STORAGE MEDIUM THEREOF

This application is a 371 of PCT Patent Application Ser. No. PCT/CN2018/083017, filed on Apr. 13, 2018, which claims priority to Chinese Patent Application No. 201710520725.7, filed on Jun. 30, 2017 and titled "VIDEO TRANSMISSION METHOD AND APPARATUS, AND COMPUTER-READABLE STORAGE MEDIUM THEREOF", the entire contents of which are incorporated herein by reference.

TECHNICAL FIELD

The present disclosure relates to the field of video play, and more particularly to a video transmission method, apparatus and computer-readable storage medium thereof.

BACKGROUND

With the advancement of science and technologies, users are imposing higher and higher requirement on definition while watching videos. Generally, high-definition videos have a large data amount. Therefore, if a bandwidth for video transmission between a video source (which is also referred to as a video sending apparatus) and a video playing apparatus (which is also referred to as a video receiving apparatus) is insufficiently large, playback of the high-definition video may not be smooth.

SUMMARY

There are provided a video transmission method, apparatus and computer-readable storage medium in the embodiments of the present disclosure.

In a first aspect, there is provided a video transmission method, comprising:

acquiring a first video frame and a second video frame of a video to be transmitted;

acquiring difference information of the second video frame relative to the first video frame; and sending the difference information to a video receiving apparatus, the difference information being used for instructing the video receiving apparatus to generate the second video frame based on the difference information and the first video frame upon receiving the first video frame.

Optionally, the acquiring a first video frame and a second video frame of a video to be transmitted comprises:

storing the first video frame and the second video frame to a cache of a video sending apparatus, the cache being configured to store a plurality of video frames to be transmitted of the video to be transmitted; and acquiring the first video frame and the second video frame from the cache.

Optionally, the acquiring difference information of the second video frame relative to the first video frame comprises:

acquiring a first ranking value for indicating a position of the second video frame in the cache; and acquiring the difference information of the second video frame relative to the first video frame if the first ranking value is less than a first threshold.

Optionally, the video to be transmitted comprises a plurality of video frames sequentially ranked, and the acquiring difference information of the second video frame relative to the first video frame comprises:

acquiring a second ranking value, the second ranking value being used for indicating a position of the video frame to be transmitted that is most recently stored into the cache in the plurality of video frames included in the video to be transmitted;

acquiring a third ranking value, the third ranking value being used for indicating a position of the second video frame in the plurality of video frames included in the video to be transmitted; and acquiring the difference information of the second video frame relative to the first video frame if a difference between the second ranking value and the third ranking value is less than a second threshold.

Optionally, the first video frame comprises a plurality of pixels, and the second video frame comprises a plurality of pixels, the plurality of pixels in the first video frame one-to-one corresponding to the plurality of pixels in the second video frame; and the acquiring difference information of the second video frame relative to the first video frame comprises:

acquiring a different pixel in the second video frame, a pixel value of the different pixel being different from a pixel value of a target pixel, and the target pixel being a pixel in the first video frame corresponding to the different pixel;

acquiring the pixel value of the different pixel; and generating the difference information based on the pixel value of the different pixel and position of the different pixel in the second video frame.

Optionally, the sending the difference information to a video receiving apparatus comprises:

sending the difference information to the video receiving apparatus via a data frame;

where the data frame comprises a frame head, a frame tail and at least one different information group, the at least one difference information group being arranged between the frame head and the frame tail, each difference information group comprising a group head, a group tail and at least one difference information field, and the at least one difference information field being arranged between the group head and the group tail; and each difference information field in each difference information group is used for indicating a pixel value of a different pixel, positions of different pixels corresponding to any two adjacent difference information fields included in each difference information group in the second video frame are adjacent, the group head comprises a position of a different pixel corresponding to a first different information field in the difference information group in the second video frame and a number of the difference information fields included in the difference information group.

In a second aspect, there is provided a video transmission method, comprising:

acquiring a first video frame of a video to be transmitted;

receiving difference information of a second video frame sent by a video sending apparatus relative to the first video frame; and generating the second video frame based on the first video frame and the difference information.

Optionally, the acquiring a first video frame a video to be transmitted comprises:

receiving the first video frame sent by the video sending apparatus; or acquiring a third video frame of the video to be transmitted and difference information of the first video frame relative to the third video frame, and generating the first video frame based on the third video frame and the difference information of the first video frame relative to the third video frame.

Optionally, the first video frame comprises a plurality of pixels, and the second video frame comprises a plurality of pixels, the plurality of pixels in the first video frame one-to-one corresponding to the plurality of pixels in the second video frame; the difference information comprises a pixel value of a different pixel in the second video frame and a position of the different pixel in the second video frame, the pixel value of the different pixel being different from a pixel value of a target pixel, the target pixel being a pixel in the first video frame corresponding to the different pixel; and the generating the second video frame based on the first video frame and the difference information comprises:

acquiring the target pixel in the first video frame based on the position of the different pixel in the second video;

modifying the pixel value of the target pixel to the pixel value of the different pixel; and acquiring the first video frame with the pixel value of the target pixel being modified as the second video frame.

Optionally, after the generating the second video frame based on the first video frame and the difference information, the method further comprises:

storing the second video frame to a cache of a video receiving apparatus, where the second video frame is provided for the video receiving apparatus generating the fourth video frame based on the second video frame and difference information of a fourth video frame relative to the second video frame, after receiving the difference information of the fourth video frame relative to the second video frame.

In a third aspect, there is provided a video sending apparatus, comprising:

a processor; and a memory;

where the memory stores one or more programs configured to be executed by the processor, and the one or more programs comprises instructions for performing operations of:

acquiring a first video frame and a second video frame of a video to be transmitted;

acquiring difference information of the second video frame relative to the first video frame; and sending the difference information to a video receiving apparatus, the difference information being used for instructing the video receiving apparatus to generate the second video frame based on the difference information and the first video frame after receiving the first video frame.

Optionally, the apparatus further comprises a cache configured to store the video frames of the video to be transmitted, and the one or more programs further comprises instructions for performing operations of:

storing the first video frame and the second video frame to the cache; and acquiring the first video frame and the second video frame from the cache Optionally, the one or more programs comprises instructions for performing operations of:

acquiring a first ranking value for indicating a position of the second video frame in the cache; and acquiring the difference information of the second video frame relative to the first video frame if the first ranking value is less than a first threshold.

Optionally, the video to be transmitted comprises a plurality of video frames sequentially ranked, and the one or more programs comprises instructions for performing operations of:

acquiring a second ranking value, the second ranking value being used for indicating a position of the video frame to be transmitted that is most recently stored into the cache in the plurality of video frames included in the video to be transmitted;

acquiring a third ranking value, the third ranking value being used for indicating a position of the second video frame in the plurality of video frames included in the video to be transmitted; and acquiring the difference information of the second video frame relative to the first video frame if a difference between the second ranking value and the third ranking value is less than a second threshold.

Optionally, the first video frame comprises a plurality of pixels, and the second video frame comprises a plurality of pixels, the plurality of pixels in the first video frame one-to-one corresponding to the plurality of pixels in the second video frame; and the one or more programs comprises instructions for performing operations of:

acquiring a different pixel in the second video frame, a pixel value of the different pixel being different from a pixel value of a target pixel, and the target pixel being a pixel in the first video frame corresponding to the different pixel;

acquiring the pixel value of the different pixel; and generating the difference information based on the pixel value of the different pixel and position of the different pixel in the second video frame.

Optionally, the one or more programs comprises instructions for performing operations of:

sending the difference information to the video receiving apparatus via a data frame;

where the data frame comprises a frame head, a frame tail and at least one different information group, the at least one difference information group being arranged between the frame head and the frame tail, each difference information group comprising a group head, a group tail and at least one difference information field, and the at least one difference information field being arranged between the group head and the group tail; and each difference information field in each difference information group is used for indicating a pixel value of a different pixel, positions of different pixels corresponding to any two adjacent difference information fields included in each difference information group in the second video frame are adjacent, the group head comprises a position of a different pixel corresponding to a first different information field in the difference information group in the second video frame and a number of the difference information fields included in the difference information group.

In a fourth aspect, there is provided a video receiving apparatus, comprising:

a processor; and a memory;

where the memory stores one or more programs configured to be executed by the processor, and the one or more programs comprises instructions for performing operations of:

acquiring a first video frame of a video to be transmitted;

receiving difference information of a second video frame sent by a video sending apparatus relative to the first video frame; and generating the second video frame based on the first video frame and the difference information.

Optionally, where the first video frame comprises a plurality of pixels, and the second video frame comprises a plurality of pixels, the plurality of pixels in the first video frame one-to-one corresponding to the plurality of pixels in the second video frame; the difference information comprises a pixel value of a different pixel in the second video frame and a position of the different pixel in the second video frame, the pixel value of the different pixel being different from a pixel value of a target pixel, the target pixel being a pixel in the first video frame corresponding to the different pixel; and the one or more programs comprises instructions for performing operations of:

acquiring the target pixel in the first video frame based on the position of the different pixel in the second video;

modifying the pixel value of the target pixel to the pixel value of the different pixel; and acquiring the first video frame with the pixel value of the target pixel being modified as the second video frame.

Optionally, the apparatus further comprises a cache configured to store the video frames of the video to be transmitted, and the one or more programs comprises instructions for performing operations of:

storing the second video frame to a cache of a video receiving apparatus, where the second video frame is provided for the video receiving apparatus generating the fourth video frame based on the second video frame and difference information of a fourth video frame relative to the second video frame, after receiving the difference information of the fourth video frame relative to the second video frame.

In a fifth aspect, there is provided a computer-readable storage medium, comprising computer programs that, when executed by a processor, perform any of the video transmission methods in the first aspect; or the computer programs that, when executed by a processor, perform any of the video transmission methods in the second aspect.

DETAILED DESCRIPTION

Figure 1:
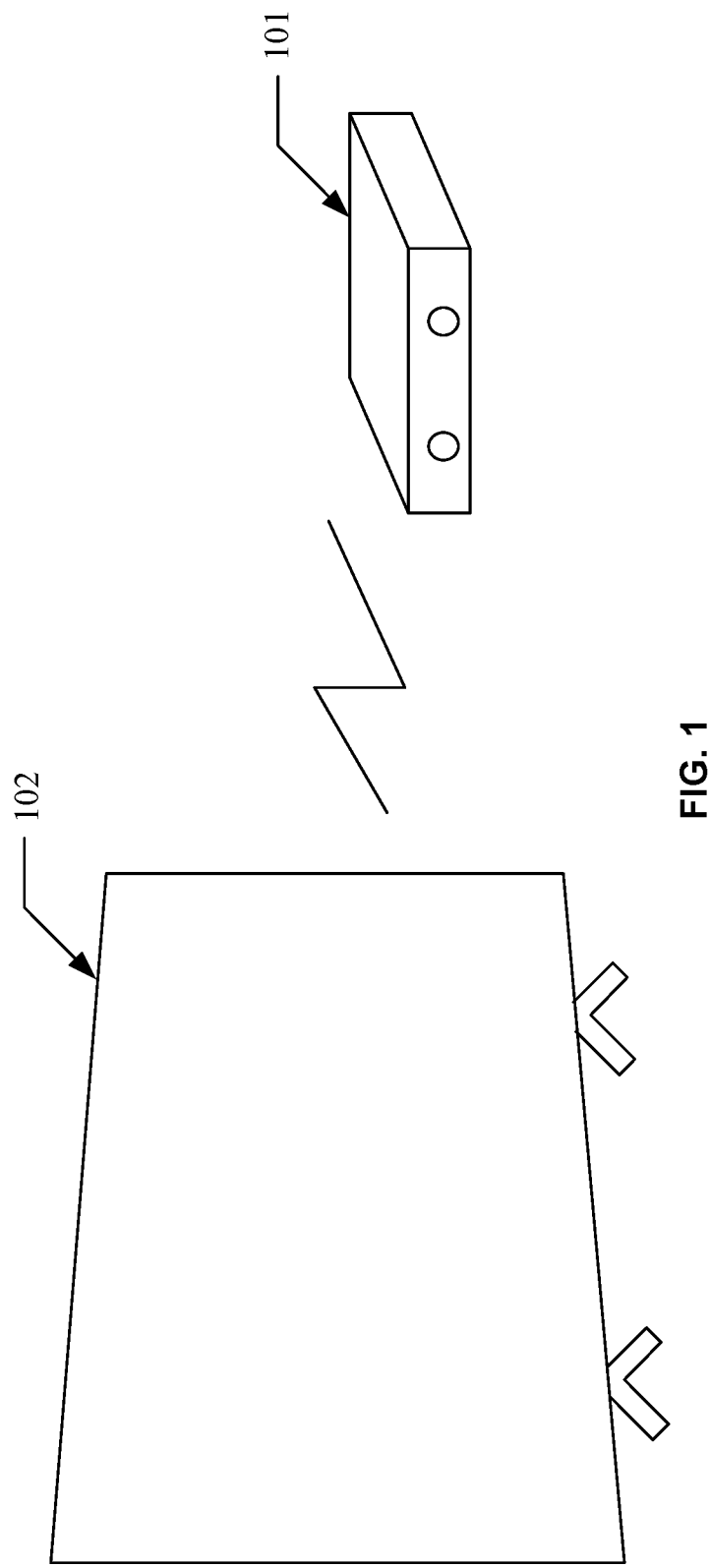
FIG. 1 is a schematic diagram of a video transmission system according an embodiment of the present disclosure.

The embodiments of the present disclosure will be described in further detail with reference to the accompanying drawings, to present the principles and advantages of the present disclosure clearer.

At present, high-definition videos are more and more common in people's daily life. For example, high definition (HD) videos or full high definition (FHD) videos are all common high-definition videos.

Generally, the high-definition videos have a large data amount. Therefore, transmission of the high-definition videos also requires a large bandwidth. When a bandwidth between a video source (which is also referred to as a video sending apparatus in the present disclosure) and a video playing apparatus (which is also referred to as a video receiving apparatus in the present disclosure) fails to satisfy the requirement for transmitting the high-definition videos, the high-definition video may not be played smoothly.

For example, in practical application, the video sending apparatus may be a digital video disc (DVD) player, and the video receiving apparatus may be a television. The DVD player may send a high-definition video stored in the disc to the television, such that the television plays the video. When a bandwidth between the DVD player and the television is small the television may not play the video smoothly.

In the related art, for the sake of a sufficient bandwidth between the video sending apparatus and the video receiving apparatus and for prevention of the unsmooth playback of the video, the video sending apparatus and the video receiving apparatus are both provided with a high-speed video interface. In this way, the high-definition video may be transmitted between the video sending apparatus and the video receiving apparatus via the high-speed video interface.

However, during video data transmission via the high-speed video interface, the video sending apparatus and the video receiving apparatus need to be arranged close to each other. That is, the high-speed video interface does not support long-distance video transmission. Consequently, the video transmission has poor flexibility.

Accordingly, an embodiment of the present disclosure provides a video transmission method. In the video transmission method, a video sending apparatus may send difference information of a second video frame of a video to be transmitted relative to a first video frame of the video to be transmitted to a video receiving apparatus, and the video receiving apparatus generates the second video frame based on the first video frame and the difference information after acquiring the first video frame and the difference information. In this way, during video transmission, the video sending apparatus only needs to transmit difference information between the video frames, with no need to transmitting the entire video frames. Generally, a data amount of the difference information between the video frames is less than a data amount of the entire video frames. Therefore, in the video transmission method according to the embodiment of the present disclosure, the bandwidth for transmitting the video is small, and thus unsmooth playback of the video may be prevented to some extent. In addition, in the video transmission method according to the embodiments of the present disclosure, video data does not need to be transmitted via the high-speed video interface. Therefore, long-distance transmission of the video data is supported, such that flexibility of video transmission is ensured.

FIG. 1 is a schematic diagram of a video transmission system according to an embodiment of the present disclosure. As illustrated in FIG. 1, the video transmission system includes a video sending apparatus 101 and a video receiving apparatus 102. The video sending apparatus 101 and the video receiving apparatus 102 may be connected in a wired or wireless manner.

The video sending apparatus 101 is a video source. That is, the video sending apparatus 101 stores videos to be transmitted. In practical application, the video sending apparatus 101 may be a digital video disc (DVD) player, a video compact disc (VCD) player, a mobile phone, a tablet computer, a server, a smart hard disk or the like. The video receiving apparatus 102 is configured to receive and play a video sent by the video sending apparatus 101. In practical application, the video receiving apparatus 102 may be a television or the like electronic device.

In a conventional video transmission method, the video receiving apparatus 102 is generally provided with a high-speed video interface, and the video sending apparatus 101 may be connected to the high-speed video interface via a dedicated line, and send a high-definition video to the video receiving apparatus 102 via the high-speed video interface, such that a bandwidth for transmitting the high-definition video is ensured, and the high-definition video may be smoothly played for a user. However, in practical application, the high-speed video interface does not support long-distance video transmission. In this way, when the video is transmitted via the high-speed video interface, the video sending apparatus 101 and the video receiving apparatus 102 need to be arranged to be close to each other. As a result, flexibility of video transmission is poor. An embodiment of the present disclosure provides a video transmission method as follows. The video transmission method prevents unsmooth playback of the video to some extent in one aspect, and ensures flexibility of video transmission in another aspect.

Figure 2:
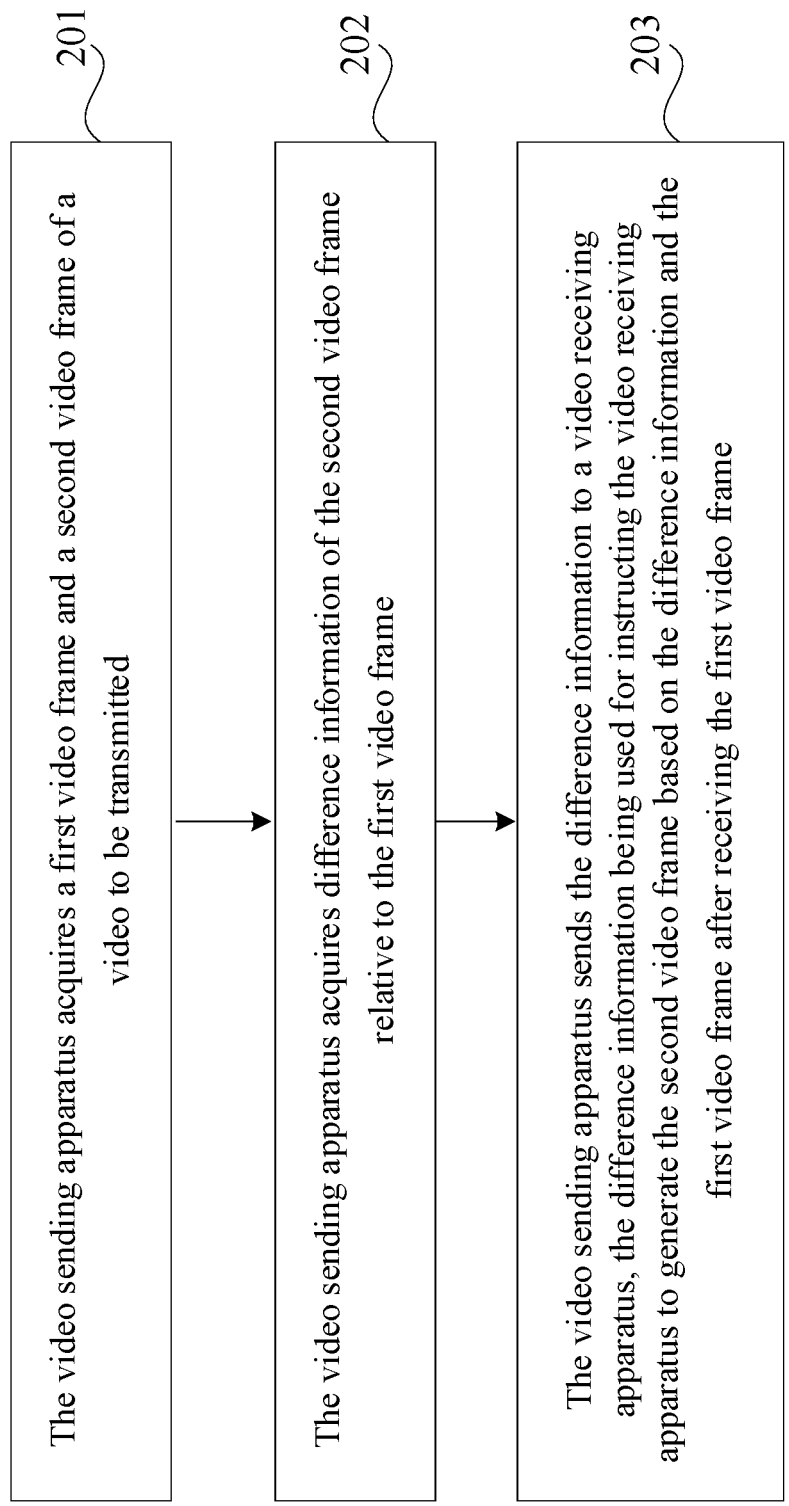
FIG. 2 is a flow chart of a video transmission method according an embodiment of the present disclosure.

FIG. 2 is a flowchart of a video transmission method according to an exemplary embodiment. As illustrated in FIG. 2, the video transmission method is applied in the video receiving apparatus 101 as illustrated in FIG. 1, and includes the following steps:

In step 201: the video sending apparatus acquires a first video frame and a second video frame of a video to be transmitted.

In step 202: the video sending apparatus acquires difference information of the second video frame relative to the first video frame.

In step 203: the video sending apparatus sends the difference information to a video receiving apparatus, the difference information being used for instructing the video receiving apparatus to generate the second video frame based on the difference information and the first video frame after receiving the first video frame.

In conclusion, in the video transmission method according to the embodiments of the present disclosure, the video receiving apparatus receives the difference information of the first video frame of the video to be transmitted relative to the second video frame of the video to be transmitted from the video sending apparatus, and the video receiving apparatus generates the second video frame based on the first video frame and the difference information after receiving the first video frame and the difference information, such that during video transmission, the video sending apparatus only needs to transmit the difference information between the video frames, with no need to transmit the entire video frames. Generally, the data amount of the difference information between the video frames is less than the data amount of the entire video frames. Therefore, in the video transmission method according to the embodiments of the present disclosure, the bandwidth for transmitting the video is small, and thus unsmooth playback of the video may be prevented to some extent.

Figure 3:
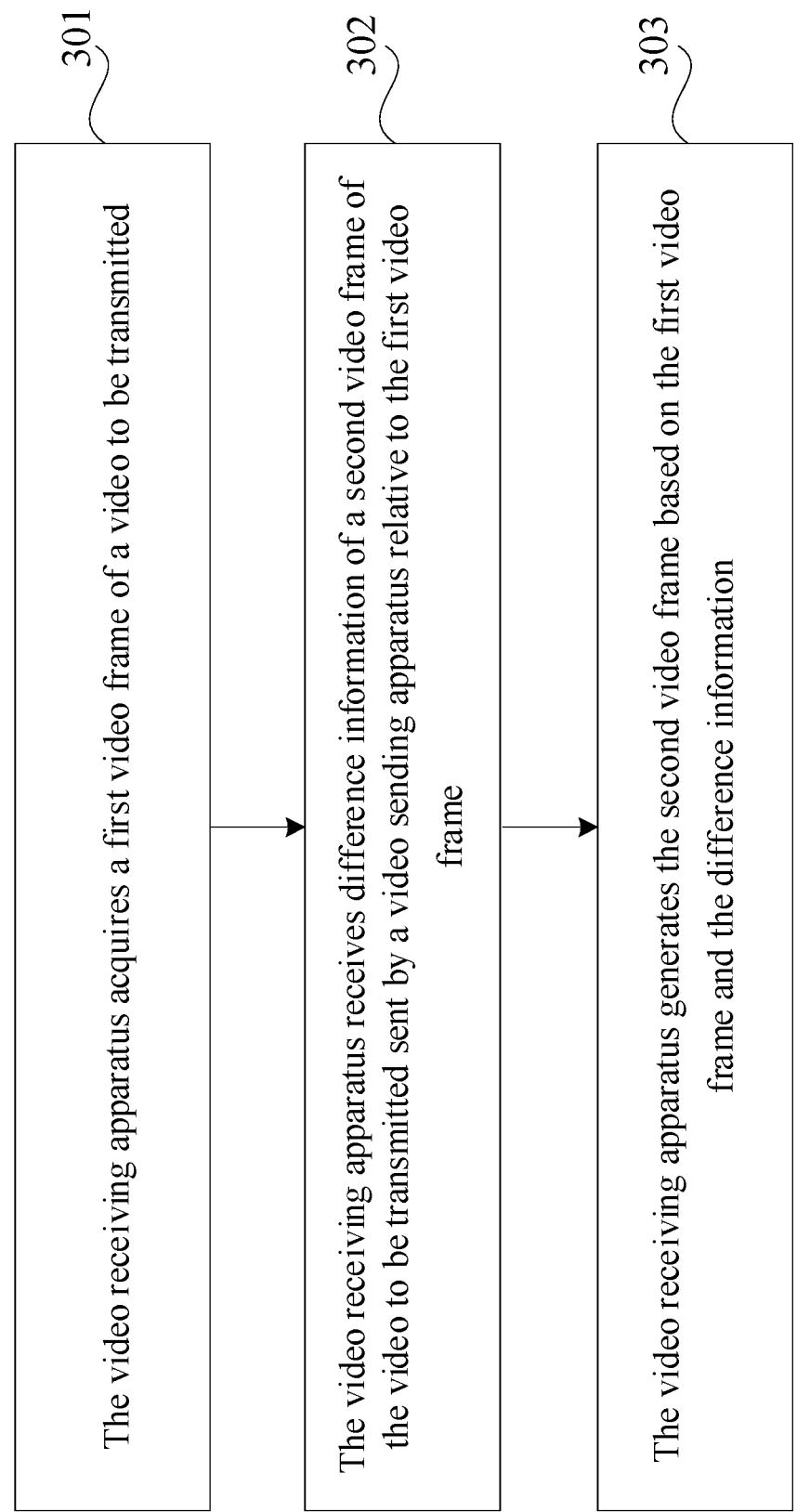
FIG. 3 is a flow chart of a video transmission method according an embodiment of the present disclosure.

FIG. 3 is a flowchart of a video transmission method according to an exemplary embodiment. As illustrated in FIG. 3, the video transmission method is applied in the video receiving apparatus 102 as illustrated in FIG. 1, and includes the following steps:

In step 301: the video receiving apparatus acquires a first video frame of a video to be transmitted.

In step 302: the video receiving apparatus receives difference information of a second video frame of the video to be transmitted sent by a video sending apparatus relative to the first video frame.

In step 303: the video receiving apparatus generates the second video frame based on the first video frame and the difference information.

In conclusion, in the video transmission method according to the embodiments of the present disclosure, the video receiving apparatus receives the difference information of the first video frame of the video to be transmitted relative to the second video frame of the video to be transmitted from the video sending apparatus, and the video receiving apparatus generates the second video frame based on the first video frame and the difference information after receiving the first video frame and the difference information, such that during video transmission, the video sending apparatus only needs to transmit the difference information between the video frames, with no need to transmit the entire video frames. Generally, the data amount of the difference information between the video frames is less than the data amount of the entire video frames. Therefore, in the video transmission method according to the embodiments of the present disclosure, the bandwidth for transmitting the video is small, and thus unsmooth playback of the video may be prevented to some extent.

Figure 4:
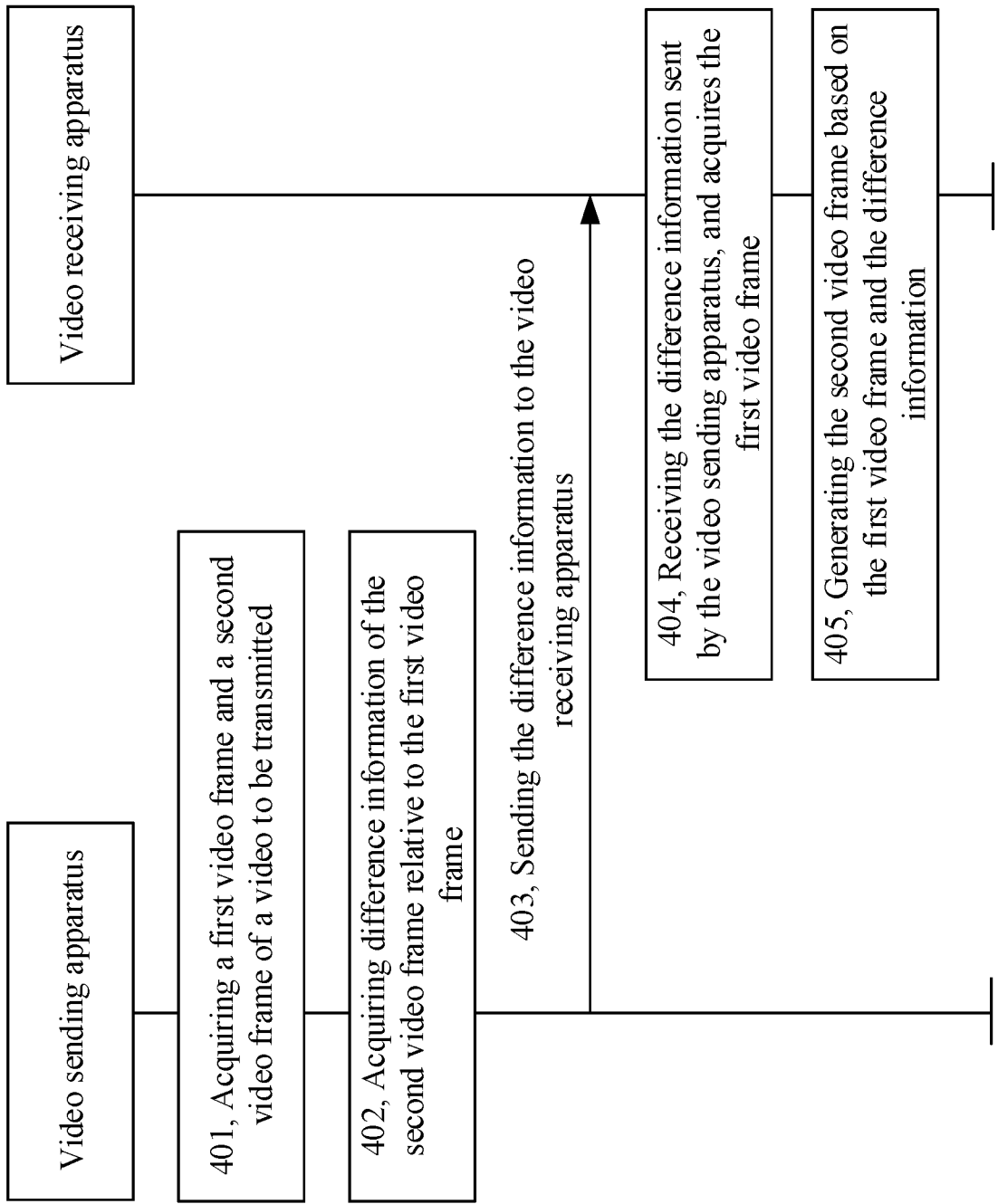
FIG. 4 is a flow chart of a video transmission method according an embodiment of the present disclosure.

FIG. 4 is a flowchart of a video transmission method according to an exemplary embodiment. As illustrated in FIG. 4, the video transmission method is applied in the video transmission system as illustrated in FIG. 1, and includes the following steps:

In Step 401: The video receiving apparatus acquires a first video frame and a second video frame of a video to be transmitted.

The video sending apparatus is a video source. The video sending apparatus stores videos to be transmitted. Herein, the video to be transmitted includes a plurality of video frames that are sequentially ranked. The video frames have the same resolution. For example, the resolutions of the plurality of video frames may be all 360×640.

In other words, each of the plurality of video frames includes a plurality of pixels, and the pixels included in each two video frames are in a one-to-one correspondence. The term "correspondence" herein means that the positions of the pixels are corresponding to each other in the video frames. For example, that a pixel p in the first video frame of the video to be transmitted corresponds to a pixel q in the second video frame of the data to be transmitted means that the position of the pixel p in the first video frame is the same as the position of the pixel q in the second video frame. That is, if the position of the pixel p in the first video frame is the third row and the fifth column, the position of the pixel q in the second video frame is also the third row and the fifth column, and in this case, the pixel p corresponds to the pixel q.

In addition, each pixel in the video to be transmitted may correspond to a pixel value. It should be noted that the pixel value herein may be an RGB (red, green and blue) color value of the pixel.

In the video transmission method according to the present disclosure, the video sending apparatus may acquire difference information of each two adjacent video frames in the video to be transmitted, and send the difference information to the video receiving apparatus, such that the video receiving apparatus generates the video frame based on the difference information. In the embodiments, description is given only by using the first video frame and the second video frame as examples. The second video frame and the first video frame may be two adjacent video frames in the plurality of video frames included in the video to be transmitted, and the first video frame is prior to the second video frame.

In the embodiments of the present disclosure, to acquire the difference information of the second video frame relative to the first video frame, the video sending apparatus needs to perform the technical process of acquiring the first video frame and the second video frame in the video to be transmitted in the step 401, to acquire the difference information between the first video frame and the second video frame in the subsequent steps.

Optionally, in the embodiments of the present disclosure, the video sending apparatus may store the plurality of video frames to be transmitted to a cache of the video sending apparatus. Herein, the first video frame and the second video frame may be any two video frames in the plurality of video frames to be transmitted. In the step 401, the video sending apparatus may acquire the first video frame and the second video frame from the cache.

In practical application, under one circumstance, the second video frame is only slightly different from the first video frame. In this case, the video sending apparatus may quickly acquire the difference information of the second video frame relative to the first video frame in the subsequent steps. That is, a delay of acquiring the difference information by the video sending apparatus is small. Under another circumstance, the second video frame is greatly different from the first video frame. In this case, the video sending apparatus may slowly acquire the difference information of the second video frame relative to the first video frame in the subsequent steps. That is, the delay of acquiring the difference information by the video sending apparatus is great. If the delay of acquiring the difference information by the video sending apparatus is great, a delay of sending the difference information by the video sending apparatus is also great, and thus a delay of generating the second video frame by the video receiving apparatus based on the difference information is also great. As a result, the video receiving apparatus may fail to smoothly play the video to be transmitted.

In the embodiments of the present disclosure, to prevent unsmooth playback of the video, the video sending apparatus may store the plurality of to-be-transmitted video frames of the video to be transmitted to the cache of the video sending apparatus, and ensures that the difference information between the video frames is acquired at a constant speed from the cache. In this way, it is ensured that the difference information is sent at a constant speed to the video receiving apparatus. The speed of sending the difference information from the cache to the video receiving apparatus may be controlled such that the speed is constant. Therefore, the greater delay and the smaller delay of acquiring the difference information can be balanced. In other words, more time is saved from the scenario of the smaller delay to the scenario of the grater delay, such that unsmooth playback of the video to be played is prevented.

Step 402: the video sending apparatus acquires difference information of the second video frame relative to the first video frame.

The difference information of the second video frame relative to the first video frame at least includes: a pixel value of a pixel in a different portion of the second video frame relative to the first video frame, and a position of the pixel in the different portion of the second video frame.

Figure 5:
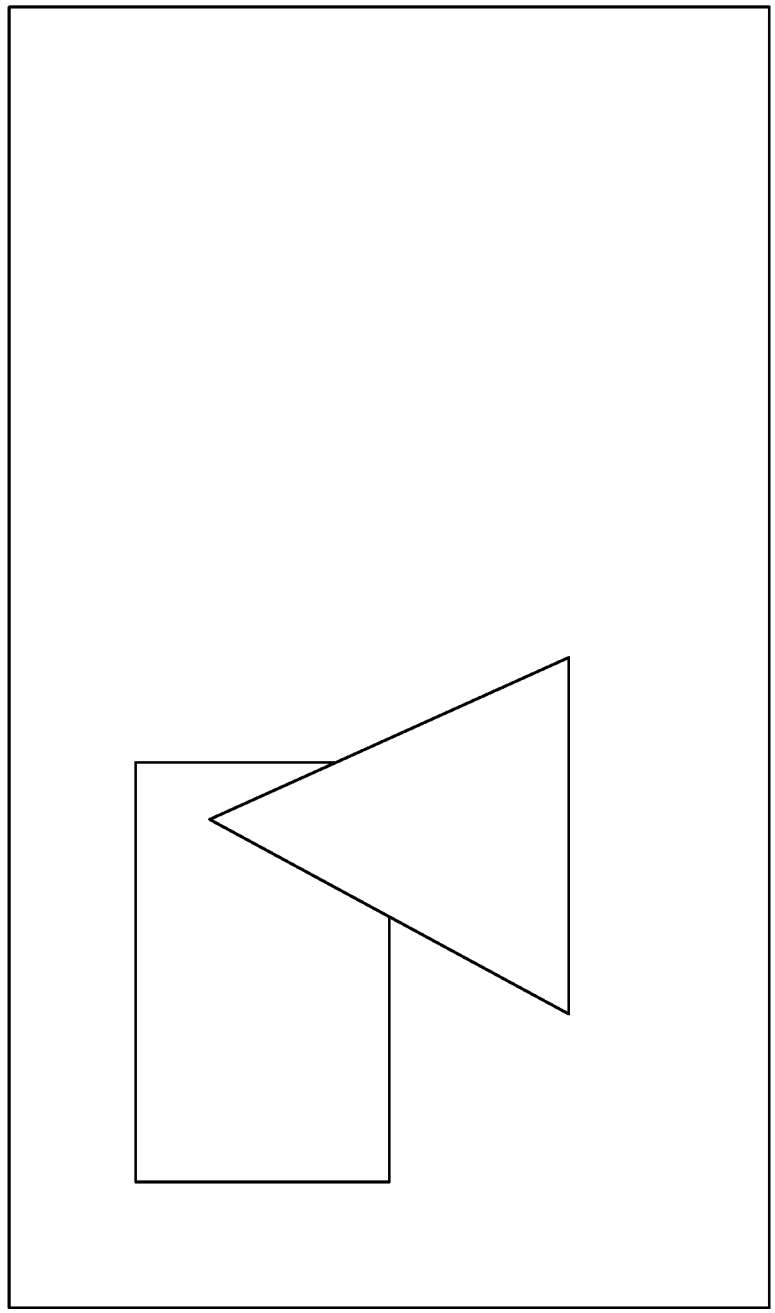
FIG. 5 is a schematic diagram of a video frame in a video to be transmitted according an embodiment of the present disclosure.
Figure 6:
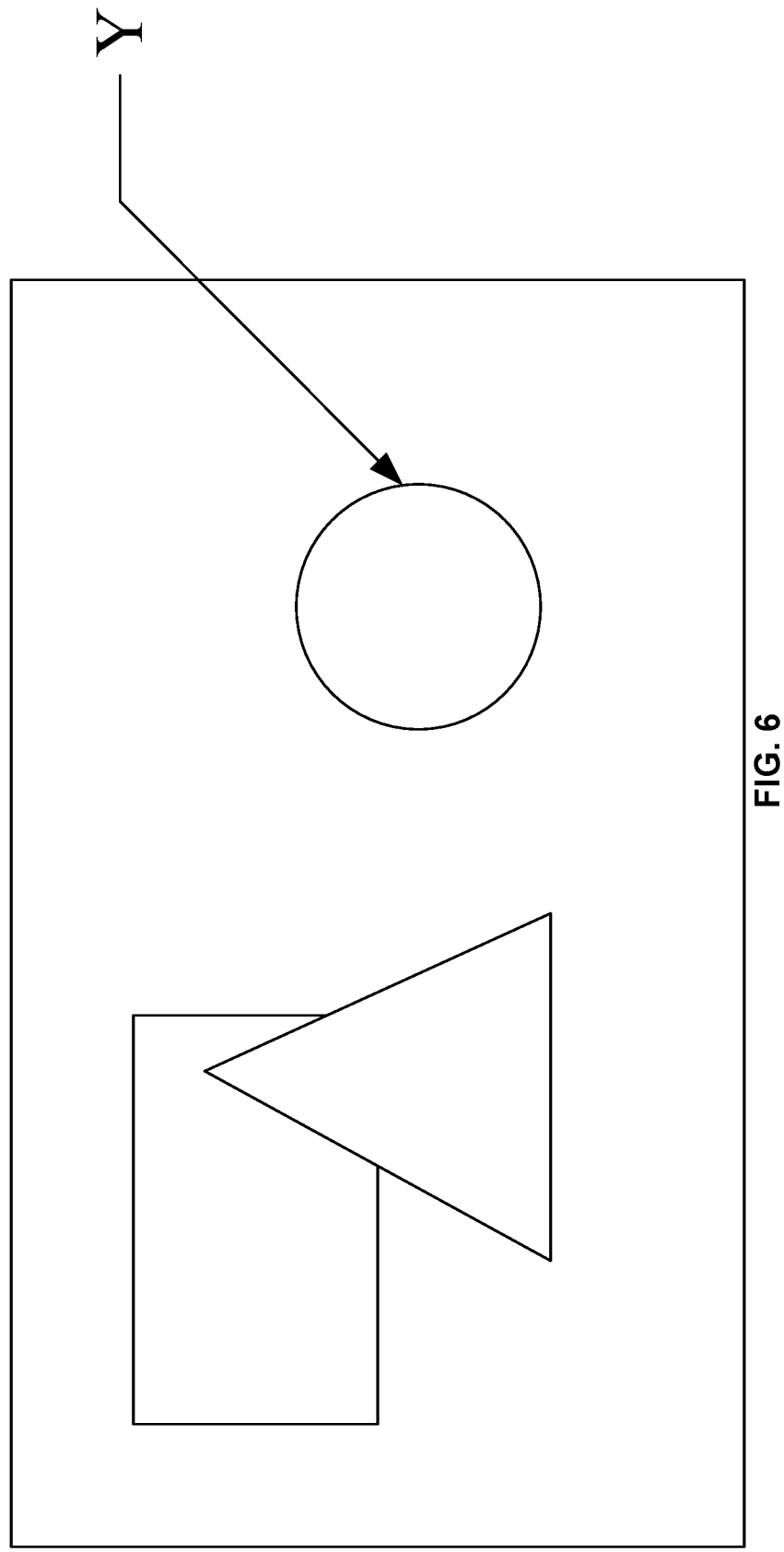
FIG. 6 is a schematic diagram of a video frame in a video to be transmitted according an embodiment of the present disclosure.

For example, FIG. 5 and FIG. 6 illustrate two video frames of the video to be transmitted, and the video frame illustrated in FIG. 6 further includes a circle Y relative to the video frame as illustrated in FIG. 5. The pixel values and the positions of the pixels corresponding to the circle Y in the video frame shown in FIG. 6 are the difference information of the video frame shown in FIG. 6 relative to the video frame shown in FIG. 5.

In an embodiment of the present disclosure, the process of acquiring the difference information of the second video frame relative to the first video frame by the video sending apparatus may be as follows: the video sending apparatus determines via comparison whether the pixel value of each pixel in the second video frame is the same as a pixel value of a corresponding pixel thereof in the first video frame; if a pixel value of a certain pixel in the second video frame is not the same as a pixel value of a corresponding pixel thereof in the first video frame, the video sending apparatus may acquire the certain pixel as a different pixel in the second video frame, and then the video sending apparatus may acquire a pixel value of the different pixel and generate the difference information based on the pixel value of the different pixel and the position of the different pixel in the second video frame.

For example, as illustrated in FIG. 5 and FIG. 6, the pixel corresponding to the circle Y as illustrated in FIG. 6 is the different pixel, and the video sending apparatus may acquire a pixel value and a position of the pixel corresponding to the circle Y in the video frame as illustrated in FIG. 6 and generate difference information of the video frame in FIG. 6 relative to the video frame in FIG. 5 based on the pixel value and the position.

In the embodiments of the present disclosure, prior to acquiring the difference information, the video sending apparatus may acquire a first ranking value for indicating a position of the second video frame in the cache, acquire the difference information of the second video frame relative to the first video frame if the first ranking value is less than a first threshold, and compress and code the second video frame and directly send the second video frame to the video receiving apparatus if the first ranking value is greater than or equal to the first threshold.

In practical application, the number of video frames stored in the cache is limited. For example, under one circumstance, the cache may only store 20 video frames, if the first ranking value for indicating the position of the second video frame in the cache is greater (greater than or equal to the first threshold, wherein when the cache only stores 20 video frames, the first threshold may be defined to 18), it indicates that, prior to the second video frame, difference information acquisition is not completed for a large number of video frames to be transmitted, and the video sending apparatus may still continuously store the video frames to be transmitted to the cache. In this case, if the video sending apparatus still acquires the difference information of the second video frame, it is likely that data overflow may occur in the cache, and thus video frames in the video to be transmitted may be lost. Therefore, in this case, the video sending apparatus may not perform the process of acquiring the difference information of the second video frame, but compress and code the second video frame and directly send the second video frame to the video receiving apparatus. On the contrary, if the first ranking value for indicating the position of the second video frame in the cache is smaller (less than the first threshold), the video sending apparatus may perform the process of acquiring the difference information of the second video frame relative to the first video frame.

In addition, in the embodiments of the present disclosure, prior to acquiring the difference information, the video sending apparatus may also acquire a second ranking value and a third ranking value; wherein the second ranking value is used for indicating a position of the video frame to be transmitted that is most recently stored into the cache in the plurality of video frames included in the video to be transmitted, and the third ranking value is used for indicating a position of the second video frame in the plurality of video frames included in the video to be transmitted. The video sending apparatus may perform the process of acquiring the difference information of the second video frame relative to the first video frame if a difference between the second ranking value and the third ranking value is less than a second threshold, and compress and code the second video frame and directly send the second video frame to the video receiving apparatus if the difference between the second ranking value and the third ranking value is greater than or equal to the second threshold.

For example, the video to be transmitted may include 1000 video frames; if a video frame that is most recently stored to the cache is ranked 500 (the second ranking value) in these 1000 video frames, and the second video frame is ranked 488 (the third ranking value) in the 1000 video frames, since a difference between 500 and 488 is 12 which is less than the second threshold (18), the video sending apparatus may perform the process of acquiring the difference information of the second video frame relative to the first video frame. If a video frame that is most recently stored to the cache is ranked 500 (the second ranking value) in these 1000 video frames, and the second video frame is ranked 480 (the third ranking value) in the 1000 video frames, since a difference between 500 and 480 is 20 which is greater than the second threshold (18), the video sending apparatus may compress and code the second video frame and directly send the second video frame to the video receiving apparatus.

In practical application, if a ranking difference between the second video frame and the to-be-transmitted video frame that is most recently stored to the cache is greater (greater than or equal to the second threshold), it indicates that the video sending apparatus acquires the difference information of the to-be-transmitted video frame stored in the cache at a low speed. In this case, if the video sending apparatus further processes the second video frame, data overflow may occur in the cache, and thus video frame loss may be caused. Therefore, in this case, the video sending apparatus may not perform the process of acquiring the difference information of the second video frame, but compress and code the second video frame and directly send the second video frame to the video receiving apparatus. On the contrary, if the ranking difference between the second video frame and the to-be-transmitted video frame that is most recently stored to the cache is smaller (less than the second threshold), the video sending apparatus may perform the process of acquiring the difference information of the second video frame relative to the first video frame.

It should be noted that the second threshold and the first threshold herein may be predefined by technical personnel based on the size of the cache, which is not specifically limited in the embodiments of the present disclosure.

In step 403: the video sending apparatus sends the difference information to the video receiving apparatus.

In practical application, the video sending apparatus may send the difference information to the video receiving apparatus via a data frame.

Figure 7:
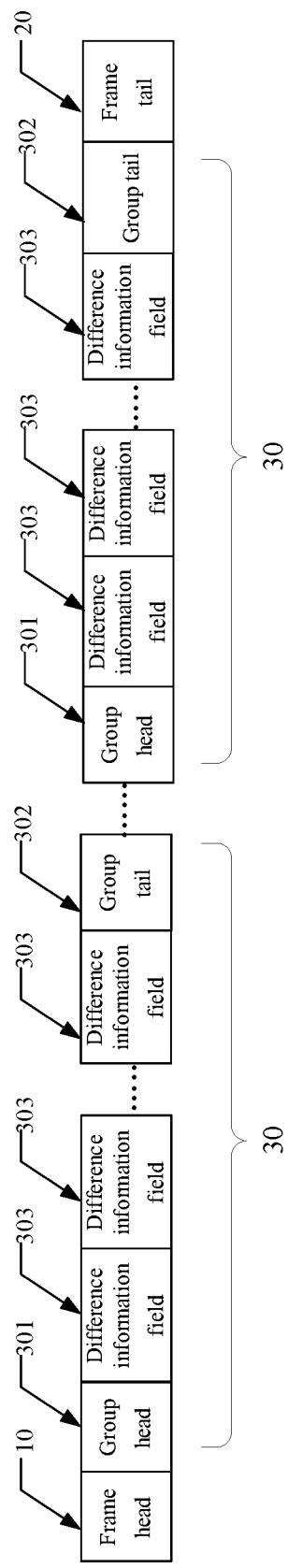
FIG. 7 is a schematic diagram of a data frame according an embodiment of the present disclosure.

FIG. 7 is an exemplary schematic diagram of a structure of the data frame. The data frame includes a frame head 10, a frame tail 20 and at least one difference information group 30. The at least one difference information group 30 is arranged between the frame head 10 and the frame tail 20. Herein, the frame head 10 may include a frame start identifier, a frame number, a frame type and the like information.

Each of the at least one difference information group 30 may include a group head 301, a group tail 302 and at least one difference information field 303. The at least one difference information field 303 is arranged between the group head 301 and the group tail 302. In each difference information group 30, each difference information field 303 is used for indicating a pixel value of a different pixel. Further, each difference information field 303 is used for uniquely indicating a pixel value of a different pixel, positions of different pixels corresponding to any two adjacent difference information fields included in each difference information group in the second video frame are adjacent, and the group head 301 includes a position of a different pixel indicated by a first different information field 303 in the difference information group 30 in the second video frame and the number of difference information fields included in the difference information group 30.

In practical application, a difference between two adjacent video frames in the video to be transmitted is generally small (for example, under one circumstance, the two adjacent video frames have the same background, whereas the foregrounds thereof are different). Therefore, the data amount of the difference information of the second video frame relative to the first video frame is generally less than the data amount of the second video frame. In this case, the bandwidth required for sending the difference information by the video sending apparatus to the video receiving apparatus is smaller than the bandwidth required for sending the second video frame by the video sending apparatus to the video receiving apparatus, such that unsmooth playback of the video may be prevented to some extent.

Further, since the required bandwidth is small, when the video sending apparatus and the video receiving apparatus are distal from each other, the video sending apparatus may transmit a video to the video receiving apparatus via another interface; and when the video sending apparatus and the video receiving apparatus are close to each other, the video sending apparatus may either transmit a video to the video receiving apparatus via another interface, or transmit a video to the video receiving apparatus via a high-speed video interface. In this way, in the embodiments of the present disclosure, video transmission may not be restricted by the distance, and thus video transmission has a high flexibility.

In step 404: the video receiving apparatus receives the difference information sent by the video sending apparatus, and acquires the first video frame.

Under one circumstance, the video sending apparatus may directly send the first video frame to the video receiving apparatus, and the video receiving apparatus may acquire the first video frame by receiving the first video frame sent by the video sending apparatus.

Under another circumstance, the video receiving apparatus may acquire a third video frame and difference information of the first video frame relative to the third video frame sent by the video sending apparatus, and generate the first video frame based on the third video frame and the difference information of the first video frame relative to the third video frame. Herein, the third video frame may be a video frame that is adjacent to the first video frame in the video to be transmitted, and the third video frame is positioned prior to the first video frame. It should be noted that the generating the first video frame by the video receiving apparatus based on the third video frame and the difference information of the first video frame relative to the third video frame may be referenced to the generating the second video frame in step 405 hereinafter, which is thus not described herein any further.

In step 405: the video receiving apparatus generates the second video frame based on the first video frame and the difference information.

As described above, the difference information includes a pixel value of a different pixel in the second video frame and a position of the different pixel in the second video frame. In this case, the step 405 may be as follows: the video receiving apparatus acquires a target pixel corresponding to the different pixel from the first video frame based on the position of the different pixel in the second video frame in the difference information. A position of the target pixel in the first video frame is the same as the position of the different pixel in the second video frame. The video receiving apparatus may subsequently modify a pixel value of the target pixel to the pixel value of the different pixel, and acquire the first video frame with the pixel value of the target pixel being modified as the second video frame.

In practical application, after generating the second video frame based on the first video frame and the difference information, the video receiving apparatus may store the second video frame to the cache of the video receiving apparatus. When the video receiving apparatus plays the video to be transmitted, the second video frame may be acquired from the cache of the video receiving apparatus, and the acquired second video frame may be displayed. In addition, the second video frame may also be provided for the video receiving apparatus, such that the video receiving apparatus, after receiving difference information of a fourth video frame relative to the second video frame, generates the fourth video frame based on the second video frame and the difference information of the fourth video frame relative to the second video frame. Herein, the fourth video frame is adjacent to the second video frame, and the second video frame is arranged before the fourth video frame.

A delay of generating the second video frame by the video receiving apparatus is related to the difference between the first video frame and the second video frame. That is, when the difference between the first video frame and the second video frame is small, the delay of generating the second video frame by the video receiving apparatus is small; whereas when the difference between the first video frame and the second video frame is great, the delay of generating the second video frame by the video receiving apparatus is great. To prevent unsmooth playback of the video to be transmitted in case of a great delay, the video receiving apparatus may store the second video frame to the cache, and ensure that the video frames are transferred from the cache to a playing component of the video receiving apparatus at a constant speed. During playback of the video to be transmitted, the speed of acquiring the video frames from the cache may be controlled to be constant. That is, the speed of transferring the video frames from the cache to the playing component of the video receiving apparatus may be controlled to be constant. Therefore, the small delay and the great delay may be balanced. In other words, more time is saved from the scenario of the smaller delay to the scenario of the grater delay, such that unsmooth playback of the video to be played is prevented.

It should be noted that the video transmission method according to the embodiments of the present disclosure may be either used for transmitting high-definition videos, or used for transmitting other types of videos, which is not specifically limited herein.

In conclusion, in the video transmission method according to the embodiments of the present disclosure, the video sending apparatus sends the difference information of the first video frame of the video to be transmitted relative to the second video frame of the video to be transmitted to the video receiving apparatus, and the video receiving apparatus generates the second video frame based on the first video frame and the difference information after receiving the first video frame and the difference information, such that during video transmission, the video sending apparatus only needs to transmit the difference information between the video frames, with no need to transmit the entire video frames. Generally, the data amount of the difference information between the video frames is less than the data amount of the entire video frames. Therefore, in the video transmission method according to the embodiments of the present disclosure, the bandwidth for transmitting the video is small, and thus unsmooth playback of the video may be prevented to some extent.

Further, since the needed bandwidth is small, when the video sending apparatus and the video receiving apparatus are distal from each other, the video sending apparatus may transmit a video to the video receiving apparatus via another interface; and when the video sending apparatus and the video receiving apparatus are close to each other, the video sending apparatus may either transmit a video to the video receiving apparatus via another interface, or transmit a video to the video receiving apparatus via a high-speed video interface. In this way, in the embodiments of the present disclosure, video transmission may not be restricted by the distance, and thus video transmission has a high flexibility.

Figure 8:
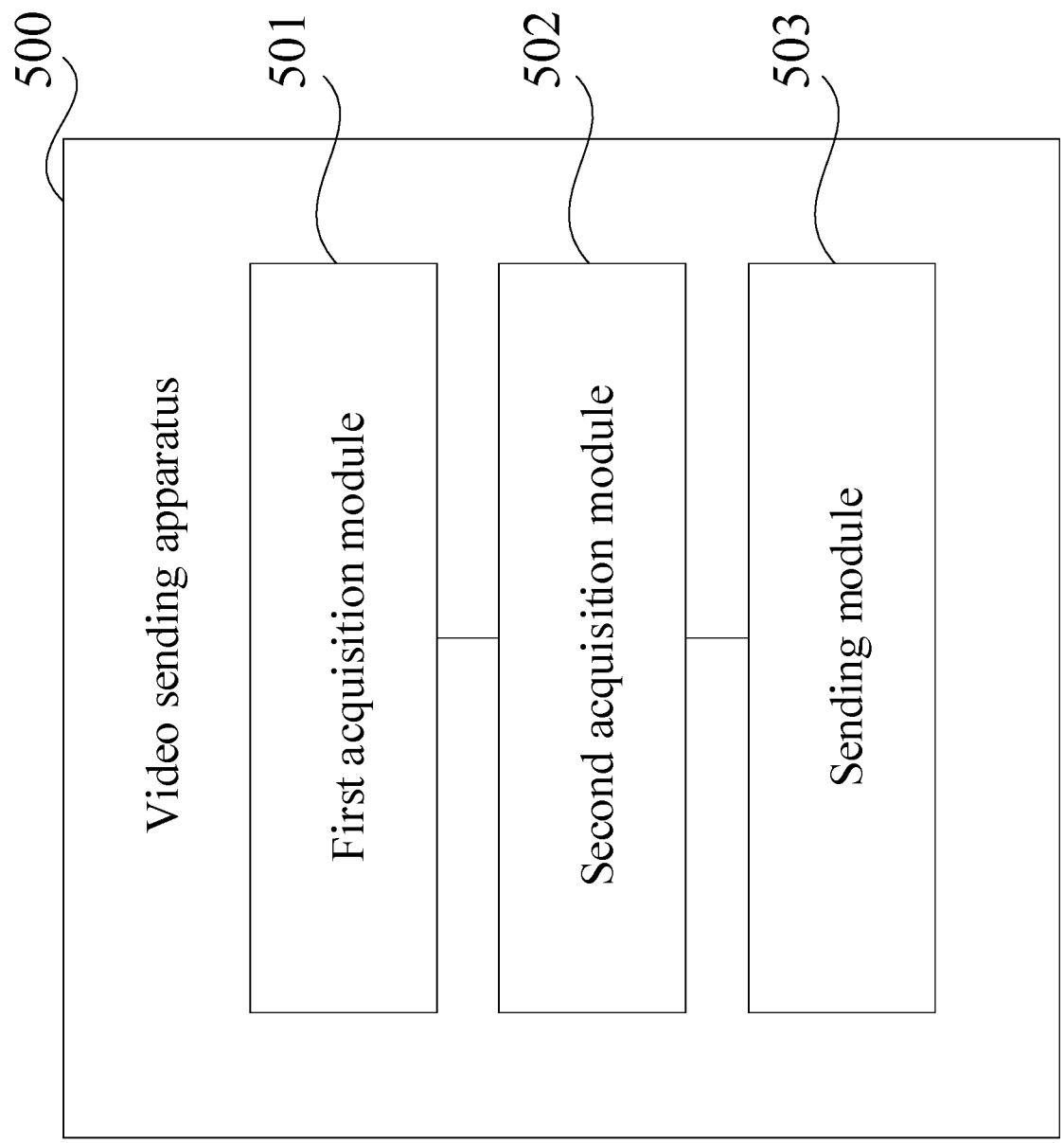
FIG. 8 is a block diagram of a video sending apparatus according an embodiment of the present disclosure.

FIG. 8 is a block diagram of a video sending apparatus 500 according to an embodiment of the present disclosure. Referring to FIG. 8, the video transmission sending 500 includes a first acquisition module 501, a second acquisition module 502 and a third acquisition module 503.

The first acquisition module 501 is configured to acquire a first video frame and a second video frame of a video to be transmitted.

The second acquisition module 502 is configured acquire difference information of the second video frame relative to the first video frame.

The sending module 503 is configured to send the difference information to a video receiving apparatus, the difference information being used for instructing the video receiving apparatus to generate the second video frame based on the difference information and the first video frame after receiving the first video frame.

In an embodiment of the present disclosure, the first acquisition module 501 is configured to: store the first video frame and the second video frame to a cache of the video sending apparatus, the cache is configured to store a plurality of video frames to be transmitted of the video to be transmitted; and acquire the first video frame and the second video frame from the cache.

In an embodiment of the present disclosure, the second acquisition module 502 is configured to: acquire a first ranking value indicative of a position of the second video frame in the cache; and acquire the difference information of the second video frame relative to the first video frame if the first ranking value is less than a first threshold.

In an embodiment of the present disclosure, the video to be transmitted comprises a plurality of video frames sequentially ranked, and the second acquisition module 502 is configured to: acquire a second ranking value, the second ranking value being used for indicating a position of the video frame to be transmitted that is most recently stored into the cache in the plurality of video frames included in the video to be transmitted; acquire a third ranking value, the third ranking value being used for indicating a position of the second video frame in the plurality of video frames included in the video to be transmitted; and acquire the difference information of the second video frame relative to the first video frame if a difference between the second ranking value and the third ranking value is less than a second threshold.

In an embodiment of the present disclosure, the first video frame comprises a plurality of pixels, and the second video frame comprises a plurality of pixels, the plurality of pixels in the first video frame one-to-one corresponding to the plurality of pixels in the second video frame; and the second acquisition module 502 is configured to: acquire a different pixel in the second video frame, a pixel value of the different pixel being different from a pixel value of a target pixel, the target pixel being a pixel in the first video frame corresponding to the different pixel; acquire the pixel value of the different pixel; and generate the difference information based on the pixel value of the different pixel and position of the different pixel in the second video frame.

In an embodiment of the present disclosure, the sending module 503 is configured to: send the difference information to the video receiving apparatus via a data frame; wherein the data frame comprises a frame head, a frame tail and at least one different information group, the at least one difference information group being arranged between the frame head and the frame tail, each difference information group comprising a group head, a group tail and at least one difference information field, the at least one difference information field being arranged between the group head and the group tail; and in each difference information group, each difference information field is used for indicating a pixel value of a different pixel, positions of different pixels corresponding to any two adjacent difference information fields included in each difference information group in the second video frame are adjacent, the group head comprises a position of a different pixel corresponding to a first different information field in the difference information group in the second video frame and the number of difference information fields included in the difference information group.

In conclusion, in the video sending apparatus according to the embodiments of the present disclosure, the difference information of the second video frame of the video to be transmitted relative to the first video frame of the video to be transmitted is sent to the video receiving apparatus, and the video receiving apparatus generates the second video frame based on the first video frame and the difference information after receiving the first video frame and the difference information, such that during video transmission, the video sending apparatus only needs to transmit the difference information between the video frames, with no need to transmit the entire video frames. Generally, the data amount of the difference information between the video frames is less than the data amount of the entire video frames. Therefore, in the video transmission method according to the embodiments of the present disclosure, the bandwidth for transmitting the video is small, and thus unsmooth playback of the video may be prevented to some extent.

Figure 9:
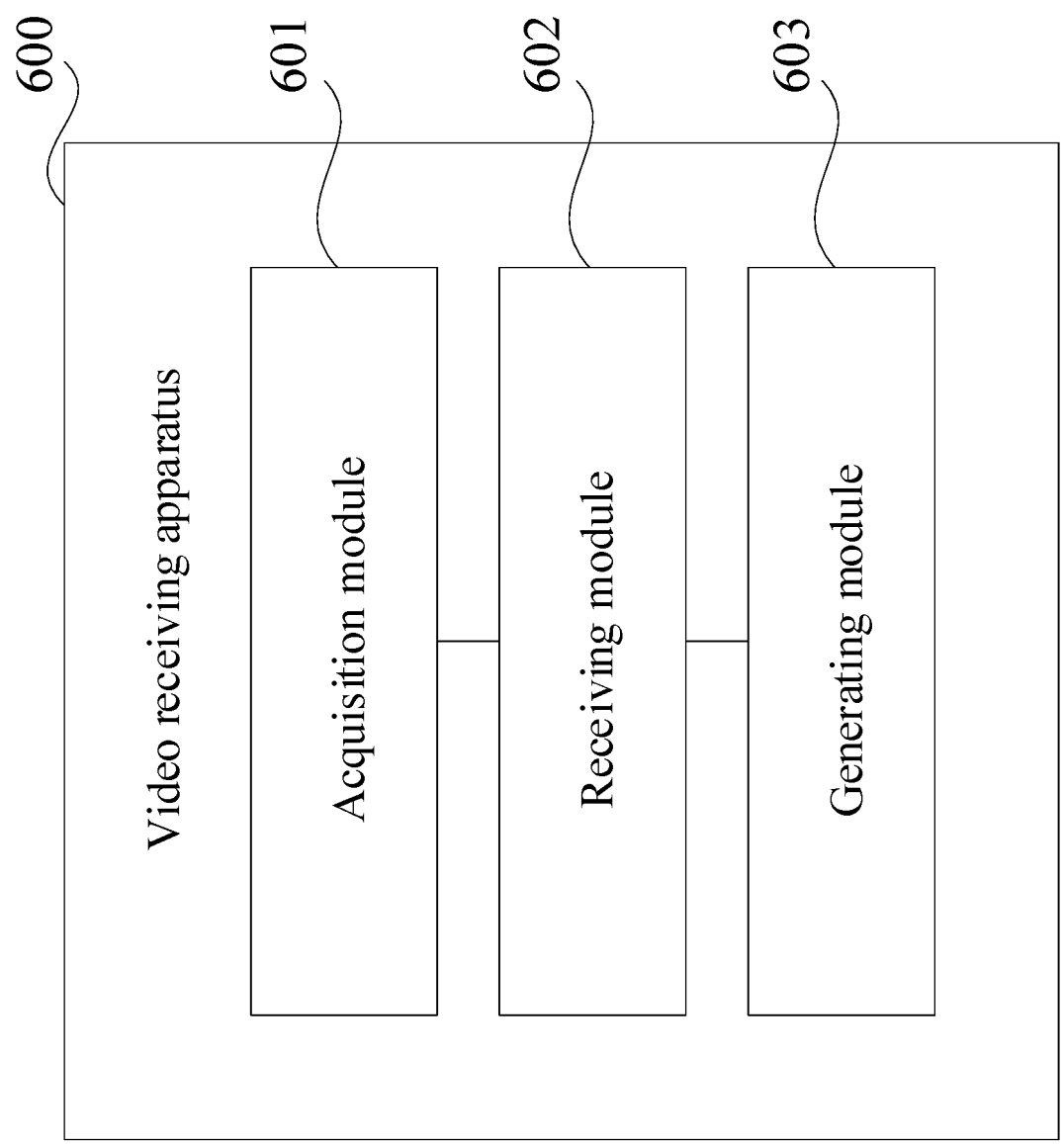
FIG. 9 is a block diagram of a video receiving apparatus according an embodiment of the present disclosure.

FIG. 9 is a block diagram of a video receiving apparatus 600 according an embodiment of the present disclosure. Referring to FIG. 9, the video receiving apparatus 600 includes an acquisition module 601, a receiving module 602 and a generating module 603.

The acquisition module 601 is configured to acquire a first video frame of a video to be transmitted.

The receiving module 602 is configured to receive difference information of a second video frame of the video to be transmitted sent by a video sending apparatus relative to the first video frame.

The generating module 603 is configured to generate the second video frame based on the first video frame and the difference information.

In an embodiment of the present disclosure, the first video frame comprises a plurality of pixels, and the second video frame comprises a plurality of pixels, the plurality of pixels in the first video frame one-to-one corresponding to the plurality of pixels in the second video frame; the difference information comprises a pixel value of a different pixel in the second video frame and a position of the different pixel in the second video frame, the pixel value of the different pixel being different from a pixel value of a pixel in the first video frame corresponding to the different pixel. The generating module 603 is configured to: acquire the target pixel in the first video frame based on the position of the different pixel in the second video; modify the pixel value of the target pixel to the pixel value of the different pixel; and acquire the first video frame with the pixel value of the target pixel being modified as the second video frame.

Figure 10:
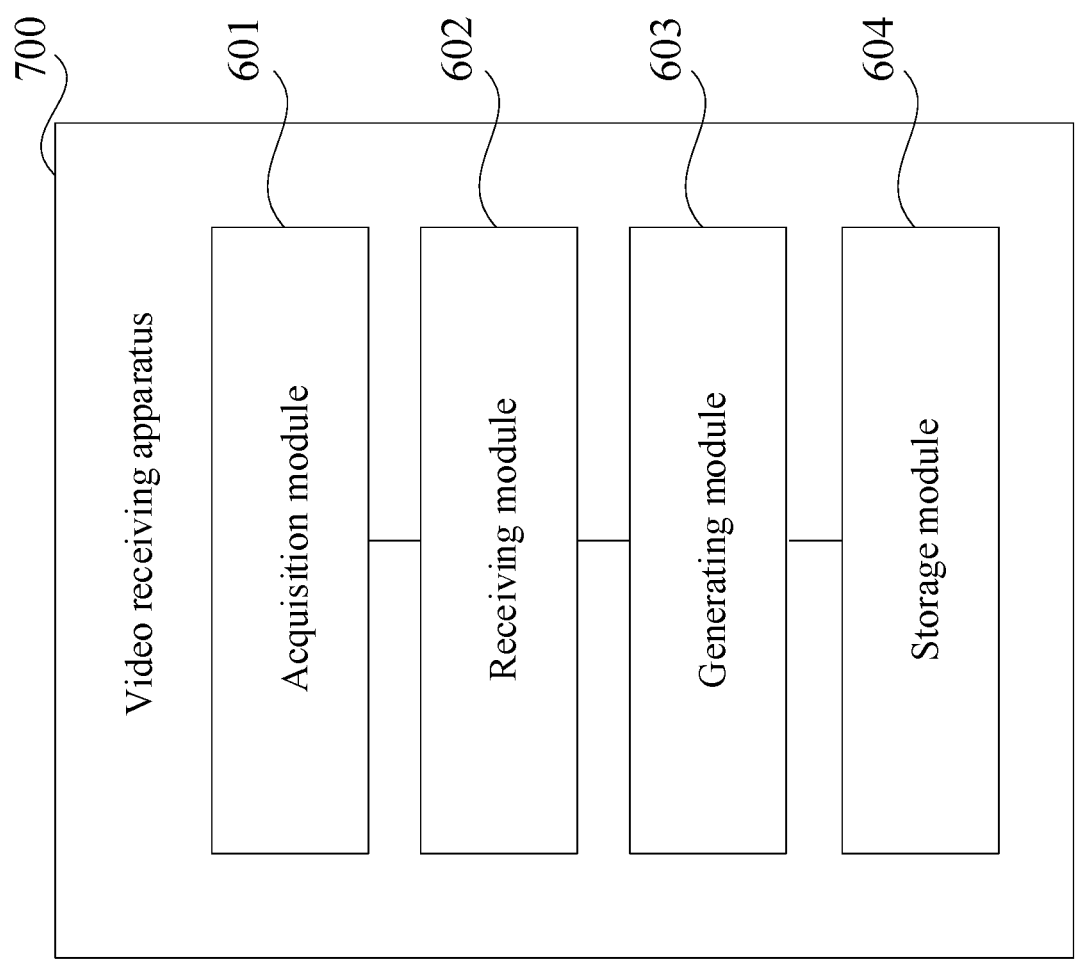
FIG. 10 is a block diagram of a video receiving apparatus according an embodiment of the present disclosure.

An embodiment of the present disclosure further provides a video receiving apparatus 700. As illustrated in FIG. 10, the video receiving apparatus 700 further includes a storage module 604 in addition to the modules included in the video receiving apparatus 600.

The storage module 604 is configured to store the second video frame to a cache of the video receiving apparatus 700.

In conclusion, in the video receiving apparatus according to the embodiments of the present disclosure, the video receiving apparatus receives the difference information of the first video frame of the video to be transmitted relative to the second video frame of the video to be transmitted from the video sending apparatus, and the video receiving apparatus generates the second video frame based on the first video frame and the difference information after receiving the first video frame and the difference information, such that during video transmission, the video sending apparatus only needs to transmit the difference information between the video frames, with no need to transmit the entire video frames. Generally, the data amount of the difference information between the video frames is less than the data amount of the entire video frames. Therefore, in the video transmission method according to the embodiment of the present disclosure, the bandwidth for transmitting the video is small, and thus unsmooth playback of the video may be prevented to some extent.

It should be noted that, during video transmission by the video sending apparatus and the video receiving apparatus according to the above embodiments, the apparatuses are described by only using division of the above functional modules as examples. In practice, the functions may be assigned to different functional modules for implementation as required. To be specific, the internal structure of the apparatus is divided into different functional modules to implement all or part of the above-described functions. In addition, the video sending apparatus and the video receiving apparatus according to the above embodiments are based on the same inventive concept as the embodiments illustrating the video transmission method. The specific implementation is elaborated in the method embodiments, which is not be detailed herein any further.

Figure 11:
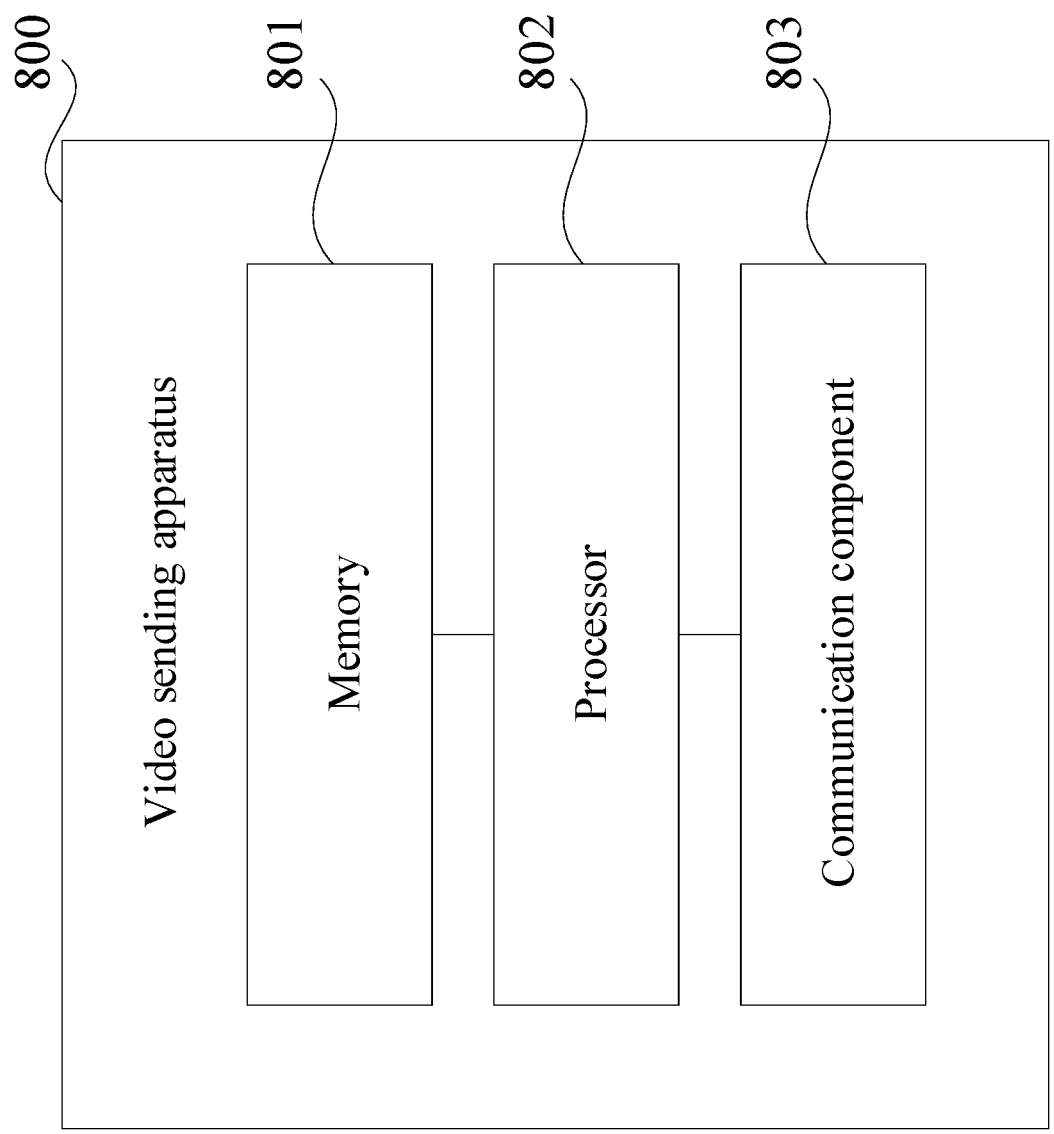
FIG. 11 is a block diagram of a video sending apparatus according an embodiment of the present disclosure.

An embodiment of the present disclosure further provides a video sending apparatus 800. The video sending apparatus 800 may be used to perform the steps performed by the video sending apparatus in the video transmission method according to the above embodiments of the present disclosure. Referring to FIG. 11, the video sending apparatus 800 includes: a memory 801, a processor 802 and a communication component 803. A person skilled in the art would understand that the structure of the video sending apparatus 800 illustrated in FIG. 11 construes no limitation to the video sending apparatus 800, and in practical application, the video sending apparatus 800 may include components more or fewer than those illustrated in the drawing, or include a combination of some components, or include different component arrangements.

The memory 801 may be configured to store software programs and modules. The memory 801 may mainly include a program storage area and a data storage area; wherein the program storage area may store an operating system and an application for implementing at least one function, and the data storage area may include a cache which may store video frames of a video to be transmitted. The memory 801 may include a high speed random access memory, or include a non-volatile memory, for example, at least one disk storage device, a flash memory device, or another non-volatile solid storage device. Correspondingly. The memory 801 may further include a memory controller for the processor 802 to access the memory 801.

The processor 802 is configured to perform various functional applications and data processing by running the software programs and modules stored in the memory 801.

The communication component 803 is configured to exchange data with other electronic devices (for example, the video receiving apparatus).

Figure 12:
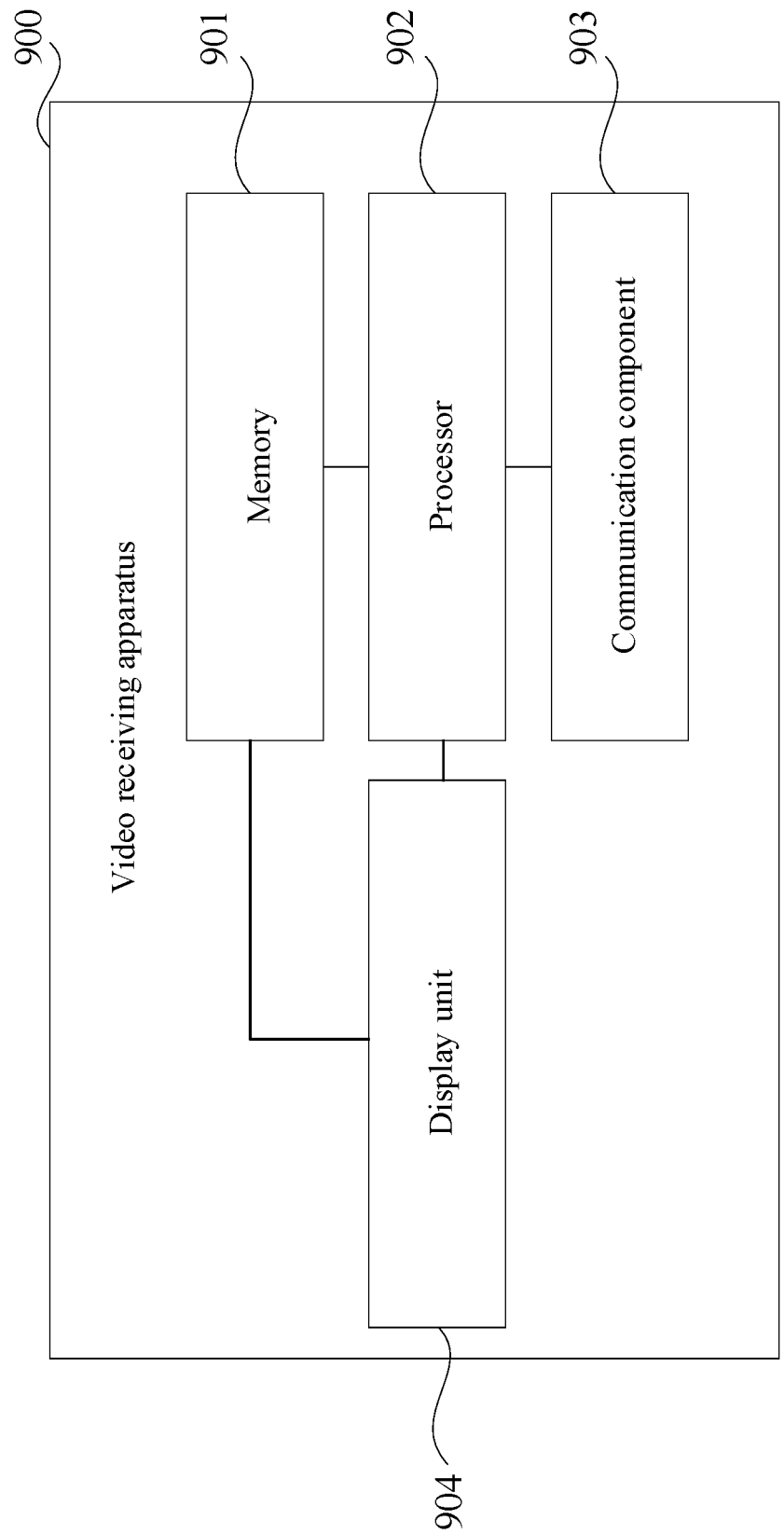
FIG. 12 is a block diagram of a video receiving apparatus according an embodiment of the present disclosure.

An embodiment of the present disclosure further provides a video receiving apparatus 900. The video receiving apparatus 900 may be used to perform the steps performed by the video receiving apparatus in the video transmission method according to the above embodiments of the present disclosure. Referring to FIG. 12, the video receiving apparatus 900 includes: a memory 901, a processor 902, a communication component 903 and a display unit 904. A person skilled in the art would understand that the structure of the video receiving apparatus 900 illustrated in FIG. 12 construes no limitation to the video receiving apparatus 900, and in practical application, the video receiving apparatus 900 may include components more or fewer than those illustrated in the drawing, or include a combination of some components, or include different component arrangements.

The memory 901 may be configured to store software programs and modules. The memory 901 may mainly include a program storage area and a data storage area; wherein the program storage area may store an operating system and an application for implementing at least one function, and the data storage area may include a cache which may store video frames of a video to be transmitted. The memory 901 may include a high speed random access memory, or include a non-volatile memory, for example, at least one disk storage device, a flash memory device, or another non-volatile solid storage device. Correspondingly. The memory 901 may further include a memory controller for the processor 902 to access the memory 901.

The processor 902 is configured to perform various functional applications and data processing by running the software programs and modules stored in the memory 901.

The communication component 903 is configured to exchange data with other electronic devices (for example, the video sending apparatus).

The display unit 904 is configured to play videos, and the display unit 904 may include a display panel. Optionally, the display panel may be configured by using a liquid crystal display (LCD), an organic light-emitting diode (OLED) or the like.

In an exemplary embodiment, a computer-readable storage medium is further provided. The computer-readable storage medium may be a non-volatile storage medium. The computer-readable storage medium stores computer programs, which, when being executed by a processor, may cause the processor to perform a video transmission method according to the embodiments of the present disclosure. For example, the method may include: acquiring a first video frame and a second video frame of a video to be transmitted; acquiring difference information of the second video frame relative to the first video frame; and sending the difference information to a video receiving apparatus, the difference information being used for instructing the video receiving apparatus to generate the second video frame based on the difference information and the first video frame after receiving the first video frame; or the method may include: acquiring a first video frame of a video to be transmitted; receiving difference information of a second video frame sent by a video sending apparatus relative to the first video frame; and generating the second video frame based on the first video frame and the difference information.

In an exemplary embodiment, a computer program product is further provided. The computer program product stores instructions that, when executed in a computer, cause the computer to perform a video transmission method according to the embodiments of the present disclosure. For example, the method may include: acquiring a first video frame and a second video frame of a video to be transmitted; acquiring difference information of the second video frame relative to the first video frame; and sending the difference information to a video receiving apparatus, the difference information being used for instructing the video receiving apparatus to generate the second video frame based on the difference information and the first video frame after receiving the first video frame; or the method may include: acquiring a first video frame of a video to be transmitted; receiving difference information of a second video frame sent by a video sending apparatus relative to the first video frame; and generating the second video frame based on the first video frame and the difference information.

In an exemplary embodiment, a chip is further provided. The chip includes programmable logic devices and/or program instructions. The chip operates to perform a video transmission method according to the embodiments of the present disclosure. For example, the method may include: acquiring a first video frame and a second video frame of a video to be transmitted; acquiring difference information of the second video frame relative to the first video frame; and sending the difference information to a video receiving apparatus, the difference information being used for instructing the video receiving apparatus to generate the second video frame based on the difference information and the first video frame after receiving the first video frame; or the method may include: acquiring a first video frame of a video to be transmitted; receiving difference information of a second video frame sent by a video sending apparatus relative to the first video frame; and generating the second video frame based on the first video frame and the difference information.

In the embodiments of the present disclosure, the relative determiner "and/or" indicates three kinds of relationship. For example, A and/or B, can be expressed as: A exists alone, A and B exist concurrently, B exists alone.

Persons of ordinary skill in the art can understand that all or part of the steps described in the above embodiments can be completed through hardware, or through relevant hardware instructed by programs stored in a computer-readable storage medium, such as read-only memory, disk or CD, etc.

The foregoing descriptions are only exemplary embodiments of the present disclosure, and are not intended to limit the present disclosure. Within the spirit and principles of the disclosure, any modifications, equivalent substitutions, improvements, etc., are within the protection scope of appended claims of the present disclosure.

What is claimed is:

1. A video transmission method, comprising:
   acquiring a first video frame and a second video frame of a video to be transmitted by: storing the first video frame and the second video frame to a cache of a video sending apparatus, the cache being configured to store a plurality of video frames to be transmitted of the video to be transmitted; and acquiring the first video frame and the second video frame from the cache;
   acquiring difference information of the second video frame relative to the first video frame by: acquiring a first ranking value indicative of a position of the second video frame in the cache; and acquiring the difference information of the second video frame relative to the first video frame if the first ranking value is less than a first threshold, wherein the difference information comprises a pixel value of a pixel of a different portion of the second video frame relative to the first video frame, and a position of the pixel of the different portion in the second video frame; and
   sending the difference information to a video receiving apparatus, the difference information being used for instructing the video receiving apparatus to generate the second video frame based on the difference information and the first video frame upon receiving the first video frame,
   wherein to generate the second video frame based on the difference information and the first video frame upon receiving the first video frame is implemented by:
   acquiring a target pixel corresponding to a different pixel from the first video frame based on a position of the different pixel in the second video frame in the difference information, wherein a position of the target pixel in the first video frame is the same as the position of the different pixel in the second video frame;
   modifying a pixel value of the target pixel to the pixel value of the different pixel; and
   acquiring the first video frame with the pixel value of the target pixel being modified as the second video frame, and
   wherein the video to be transmitted comprises a plurality of video frames that are sequentially ranked, and the acquiring difference information of the second video frame relative to the first video frame comprises:
   acquiring a second ranking value, the second ranking value being used for indicating positions of the video frames to be transmitted that are most recently stored into the cache in the plurality of video frames included in the video to be transmitted;
   acquiring a third ranking value, the third ranking value being used for indicating a position of the second video frame in the plurality of video frames included in the video to be transmitted; and
   acquiring the difference information of the second video frame relative to the first video frame if a difference between the second ranking value and the third ranking value is less than a second threshold.

2. The method according to claim 1, wherein the first video frame comprises a plurality of pixels, and the second video frame comprises a plurality of pixels, the plurality of pixels in the first video frame one-to-one corresponding to the plurality of pixels in the second video frame; and the acquiring difference information of the second video frame relative to the first video frame comprises:
   acquiring a different pixel in the second video frame, a pixel value of the different pixel being different from a pixel value of a target pixel, the target pixel being a pixel in the first video frame corresponding to the different pixel;
   acquiring the pixel value of the different pixel; and
   generating the difference information based on the pixel value of the different pixel and position of the different pixel in the second video frame.

3. The method according to claim 2, wherein the sending the difference information to a video receiving apparatus comprises:
   sending the difference information to the video receiving apparatus via a data frame;
   wherein the data frame comprises a frame head, a frame tail and at least one difference information group, the at least one difference information group being arranged between the frame head and the frame tail, each difference information group comprising a group head, a group tail and at least one difference information field, the at least one difference information field being arranged between the group head and the group tail; and
   in each difference information group, each difference information field is used for indicating a pixel value of a different pixel, positions of different pixels corresponding to any two adjacent difference information fields included in each difference information group in the second video frame are adjacent, the group head comprises a position of a different pixel corresponding to a first different information field in the difference information group in the second video frame and the number of difference information fields included in the difference information group.

4. A video transmission method, comprising:
   acquiring a first video frame of a video to be transmitted;
   receiving difference information of a second video frame sent by a video sending apparatus relative to the first video frame; and
   generating the second video frame based on the first video frame and the difference information by: acquiring a target pixel corresponding to a different pixel from the first video frame based on a position of the different pixel in the second video frame in the difference information, wherein a position of the target pixel in the first video frame is the same as the position of the different pixel in the second video frame; modifying a pixel value of the target pixel to the pixel value of the different pixel; and acquiring the first video frame with the pixel value of the target pixel being modified as the second video frame, wherein the difference information is acquired, by the video sending apparatus, in response to a first ranking value indicative of a position of the second video frame in a cache of the video sending apparatus is less than a first threshold;

wherein the video to be transmitted comprises a plurality of video frames that are sequentially ranked, and the difference information is acquired by the video sending apparatus in response to that a difference between a second ranking value and a third ranking value is less than a second threshold, the second ranking value being used for indicating positions of the video frames to be transmitted that are most recently stored into the cache in the plurality of video frames included in the video to be transmitted, the third ranking value being used for indicating a position of the second video frame in the plurality of video frames included in the video to be transmitted, and the difference information comprises a pixel value of a pixel of a different portion of the second video frame relative to the first video frame, and a position of the pixel of the different portion in the second video frame.

5. The method according to claim 4, wherein the acquiring a first video frame of a video to be transmitted comprises one of:

receiving the first video frame sent by the video sending apparatus; and acquiring a third video frame of the video to be transmitted and difference information of the first video frame relative to the third video frame, and generating the first video frame based on the third video frame and the difference information of the first video frame relative to the third video frame.

6. The method according to claim 4, wherein the first video frame comprises a plurality of pixels, and the second video frame comprises a plurality of pixels, the plurality of pixels in the first video frame one-to-one corresponding to the plurality of pixels in the second video frame; the difference information comprises a pixel value of a different pixel in the second video frame and a position of the different pixel in the second video frame, the pixel value of the different pixel being different from a pixel value of a target pixel, the target pixel being a pixel in the first video frame corresponding to the different pixel.

7. The method according to claim 4, wherein upon the generating the second video frame based on the first video frame and the difference information, the method further comprises:

storing the second video frame to a cache of a video receiving apparatus, wherein the second video frame is provided for the video receiving apparatus, such that the receiving apparatus, upon receiving difference information of a fourth video frame relative to the second video frame, generates the fourth video frame based on the second video frame and the difference information of a fourth video frame relative to the second video frame.

8. A video sending apparatus, comprising:
a processor;
a cache, and
a memory;

wherein the memory stores one or more programs configured to be executed by the processor, the one or more programs comprises instructions for performing operations of:

acquiring a first video frame and a second video frame of a video to be transmitted by: storing the first video frame and the second video frame to the cache, the cache being configured to store a plurality of video frames of the video to be transmitted; and acquiring the first video frame and the second video frame from the cache;

acquiring difference information of the second video frame relative to the first video frame by: acquiring a first ranking value indicative of a position of the second video frame in the cache; and acquiring the difference information of the second video frame relative to the first video frame if the first ranking value is less than a first threshold, wherein the difference information comprises a pixel value of a pixel of a different portion of the second video frame relative to the first video frame, and a position of the pixel of the different portion in the second video frame; and sending the difference information to a video receiving apparatus, the difference information being used for instructing the video receiving apparatus to generate the second video frame based on the difference information and the first video frame upon receiving the first video frame, wherein to generate the second video frame based on the difference information and the first video frame upon receiving the first video frame is implemented by:

acquiring a target pixel corresponding to a different pixel from the first video frame based on a position of the different pixel in the second video frame in the difference information, wherein a position of the target pixel in the first video frame is the same as the position of the different pixel in the second video frame;

modifying a pixel value of the target pixel to the pixel value of the different pixel; and acquiring the first video frame with the pixel value of the target pixel being modified as the second video frame, wherein the video to be transmitted comprises a plurality of video frames that are sequentially ranked, and the acquiring difference information of the second video frame relative to the first video frame comprises:

acquiring a second ranking value, the second ranking value being used for indicating positions of the video frames to be transmitted that are most recently stored into the cache in the plurality of video frames included in the video to be transmitted;

acquiring a third ranking value, the third ranking value being used for indicating a position of the second video frame in the plurality of video frames included in the video to be transmitted; and acquiring the difference information of the second video frame relative to the first video frame if a difference between the second ranking value and the third ranking value is less than a second threshold.

9. The apparatus according to claim 8, wherein the first video frame comprises a plurality of pixels, and the second video frame comprises a plurality of pixels, the plurality of pixels in the first video frame one-to-one corresponding to the plurality of pixels in the second video frame; and the one or more programs comprises instructions for performing operations of:

acquiring a different pixel in the second video frame, a pixel value of the different pixel being different from a pixel value of a target pixel, the target pixel being a pixel in the first video frame corresponding to the different pixel;

acquiring the pixel value of the different pixel; and generating the difference information based on the pixel value of the different pixel and position of the different pixel in the second video frame.

10. The apparatus according to claim 9, wherein the one or more programs comprises instructions for performing operations of:

sending the difference information to the video receiving apparatus via a data frame;

wherein the data frame comprises a frame head, a frame tail and at least one different information group, the at least one difference information group being arranged between the frame head and the frame tail, each difference information group comprising a group head, a group tail and at least one difference information field, the at least one difference information field being arranged between the group head and the group tail; and in each difference information group, each difference information field is used for indicating a pixel value of a different pixel, positions of different pixels corresponding to any two adjacent difference information fields included in each difference information group in the second video frame are adjacent, the group head comprises a position of a different pixel corresponding to a first different information field in the difference information group in the second video frame and the number of difference information fields included in the difference information group.

11. A video receiving apparatus, comprising:

a processor; and a memory;

wherein the memory stores one or more programs configured to be executed by the processor, the one or more programs comprises instructions for performing the method according to claim 4.

12. The apparatus according to claim 11, wherein the first video frame comprises a plurality of pixels, and the second video frame comprises a plurality of pixels, the plurality of pixels in the first video frame one-to-one corresponding to the plurality of pixels in the second video frame; the difference information comprises a pixel value of a different pixel in the second video frame and a position of the different pixel in the second video frame, the pixel value of the different pixel being different from a pixel value of a target pixel, the target pixel being a pixel in the first video frame corresponding to the different pixel.

13. A non-transitory computer-readable storage medium, comprising computer programs that, when executed by a processor, perform the video transmission method according to claim 1.

14. A non-transitory computer-readable storage medium, comprising computer programs that, when executed by a processor, perform the video transmission method according to claim 4.

* * * * *